(12) United States Patent
Wilson

(10) Patent No.: US 6,446,742 B1
(45) Date of Patent: Sep. 10, 2002

(54) WHEELED PLATFORM VEHICLE

(76) Inventor: Robert Coburn Wilson, R.R. #5-9177 Horton Line, Blenheim ONT. (CA), N0P 1A0

( * ) Notice: Subject to any disclaimer, the term of this patent is extended or adjusted under 35 U.S.C. 154(b) by 0 days.

(21) Appl. No.: 09/648,415

(22) Filed: Aug. 28, 2000

(51) Int. Cl.$^7$ .................................................. B60K 1/00
(52) U.S. Cl. ...................................... 180/65.6; 180/908
(58) Field of Search ............................... 180/65.1, 65.6, 180/65.8, 907, 908, 65.5, 19.1, 19.2, 19.3; 280/87.041; 297/DIG. 10

(56) References Cited

U.S. PATENT DOCUMENTS

| | | | |
|---|---|---|---|
| 3,107,105 A | * 10/1963 | Heriford | 280/211 |
| 3,314,494 A | * 4/1967 | Weitzner | 180/30 |
| 3,446,304 A | * 5/1969 | Alimanestiano | 180/9.24 |
| 3,872,945 A | * 3/1975 | Hickman et al. | 180/65.6 |
| 4,119,163 A | * 10/1978 | Ball | 180/6.5 |
| 4,287,966 A | * 9/1981 | Frees | 187/231 |
| 4,518,057 A | 5/1985 | McCallum | |
| 4,520,893 A | 6/1985 | Keough | |
| 4,533,013 A | 8/1985 | Hightower | |
| 4,538,695 A | * 9/1985 | Bradt | 180/19.2 |
| 4,560,018 A | * 12/1985 | Satzler | 180/9.1 |
| 4,664,208 A | 5/1987 | Horiuchi et al. | |
| 4,782,905 A | 11/1988 | Kole | |
| 4,782,906 A | * 11/1988 | Kole | 180/23 |
| 4,802,542 A | * 2/1989 | Houston et al. | 180/65.5 |
| 4,807,716 A | 2/1989 | Hawkins | |
| 4,836,325 A | 6/1989 | Enckimoto et al. | |
| 4,898,508 A | 2/1990 | Hayata | |
| 4,919,225 A | 4/1990 | Sturges | |
| 4,985,947 A | * 1/1991 | Ethridge | 5/81.1 RP |
| 4,987,622 A | * 1/1991 | Shockey | 5/86.1 |
| 5,094,313 A | 3/1992 | Mauws | |
| 5,168,947 A | * 12/1992 | Rodenborn | 180/19.1 |
| 5,390,753 A | * 2/1995 | Parker | 180/19.1 |
| 5,409,250 A | * 4/1995 | Csotonyi | 280/304.1 |
| 5,479,998 A | 1/1996 | Ishikawa | |
| 5,687,443 A | 11/1997 | Moore | |
| 5,964,313 A | * 10/1999 | Guy | 180/332 |
| 6,325,167 B1 | * 12/2001 | Jiang | 180/9.32 |

* cited by examiner

Primary Examiner—Brian L. Johnson
Assistant Examiner—Bryan Fischmann
(74) Attorney, Agent, or Firm—Bereskin & Parr

(57) ABSTRACT

A self-propelled vehicle which is particularly useful for disabled persons. The vehicle consists of a housing having a substantially flat top surface with a left and right side. The vehicle also has a first handle securely mounted to the housing at a position above the left side of the top surface at a height above the top surface sufficient to permit a user to grasp the first handle with their left hand when the user is standing on the top surface. The vehicle also has a second handle mounted to the housing at a position above the fight side of the top surface at a height above the top surface sufficient to permit the user to grasp the second handle with their right hand when the user is standing on the top surface. The first and second handles are spaced apart to permit a user to stand on the top surface between the two handles. The vehicle also has a first and second set of wheels mounted to the housing adjacent the left and right sides of the top surface, respectively. Finally, the vehicle has a drive mechanism for selectively driving the wheels, the drive mechanism being controlled by a control panel.

9 Claims, 3 Drawing Sheets

WHEELED PLATFORM VEHICLE

FIELD OF THE INVENTION

The invention relates generally to the field of power wheeled vehicles for disabled persons.

BACKGROUND OF THE INVENTION:

To increase the mobility of disabled people who have only partial use of their legs, various motorized vehicles have been introduced. Usually these motorized vehicles consist of a wheel chair device with electrically powered drive wheels. The user generally sits down in the chair and operates the drive wheels via a control unit located in one of the wheel chair arms. Electrically operated wheel chair devices have been quite successful and has greatly increased the mobility of many disabled individuals. However, these wheel chair devices are quite limited in their use since they require substantially flat paved surfaces to operate on. Furthermore, since these devices have a relatively high center of gravity, if an electrically powered wheel chair was used on non-paved surfaces, the chances of it falling on it's side are relatively high. In addition, given the relatively high center of gravity of these devices, and given the relative height of the seat portion of the wheel chair, it is very difficult for a disabled person to stand a wheel chair upright once it has toppled over. Therefore, there remains a need for an all terrain vehicle specifically for use by disabled individuals which is easy to operate and safe.

SUMMARY OF THE INVENTION

The present invention is a self-propelled vehicle having a housing with a substantially flat top surface the top surface having left and right sides. A first and second handle are mounted to the top surface such that the first and second handles are positioned above the left and right sides, respectively, of the top surface. The first and second handles being further positioned to be sufficiently spaced apart to permit a user to stand on the top surface between the handles and grasp the first and second handles with the left and right hand, respectively. The vehicle also has a drive mechanism for selectively driving the wheels, the drive mechanism having a control panel for controlling the drive mechanism.

Other and further objects, details and advantages of the present invention will become apparent from the following detailed description of the preferred embodiments thereof, when read in conjunction with the accompanying drawings:

DETAILED DESCRIPTION OF THE INVENTION

Figure 1:
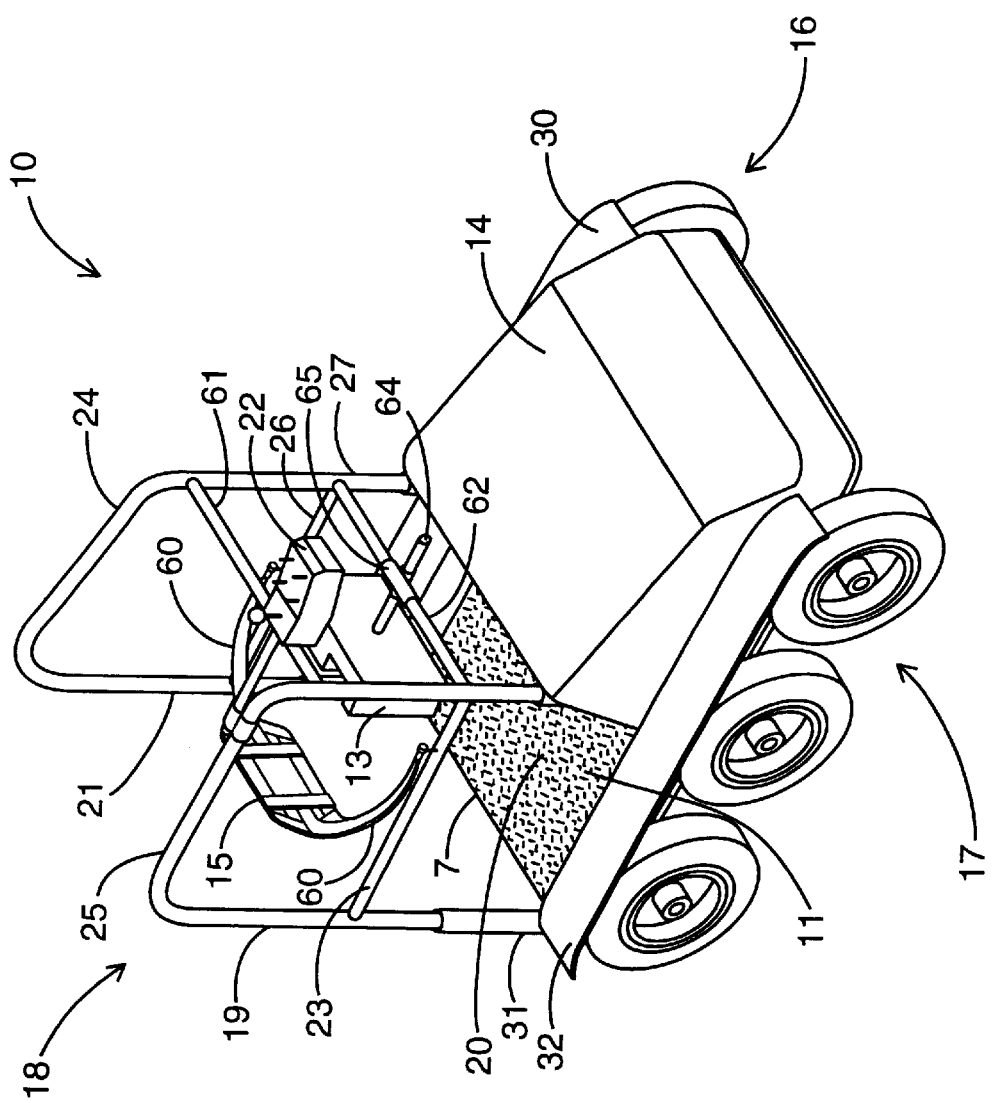
FIG. 1: Is a perspective view of the invention.

Referring firstly to FIG. 1, the multi wheel vehicle made in accordance with the present invention, shown generally as item 10, consists of a platform 20 having a plurality of drive wheels 17 and 16 mounted on the right and left sides of the platform, respectively, a drive mechanism 73 (see FIGS. 4 and 5) for selectively driving all the wheels, a fairing 18 for securing the driver and a control unit 22 located on the fairing for controlling the device. Fairing 18 consists of members 19 and 21 respectively which are anchored to platform 20 on the right and left hand sides of the platform, respectively. Member 19 preferably consists of a U-shaped metal bar having a horizontal top end 25 and a lower end 31 which is securely mounted to platform 20. Side member 21 consists of a U-shaped member having lower end 27 which is securely mounted to platform 20 and a horizontal top end 24. Preferably the lengths of members 19 and 21 are selected so that horizontal ends 25 and 24 are slightly above the operator's waist when the operator stands on platform 20. Fairing 18 is stiffened by horizontal cross members 23 and 26 which are mounted to members 19 and 21 respectively. In addition, cross members 62 and 61 are rigidly mounted to members 19 and 21 to further stiffen fairing 18.

To ensure that the driver is comfortably contained in fairing 18, vehicle 10 is provided with removable safety belt 15 having straps 60 which are removably mounted to fairing 18. In addition, fairing 18 has shin support 13 mounted to cross member 62 via arm 64. Arm 64 is adjustably mounted to member 62 via adjustable mount 65. Mount 65 may comprise a locking sleeve which permits support 13 to be adjusted either forward or back as required to suit the user. Members 19 and 21 are preferably telescoping to permit the heights of horizontal members 24 and 25 to be adjusted to suit the needs of the user.

Platform 20 has top surface 11 which is adapted to be stood upon by the user. Preferably surface 11 is treated with a matting or some other non-slip material to decrease the chances of the user slipping off platform 20. Top surface 11 may also be treated with a shock absorbing material to provide the user with a smoother ride. Fairing 18 has rear opening 7 to permit a user to enter the fairing and stand on top surface 11. Entering the vehicle from the back makes the vehicle easier to enter and exit, especially for a disabled person.

The operation of wheels 16 and 17 is controlled by control unit 22 which is preferably mounted on fairing 18 in a position convenient to the user. Control unit 22 controls the drive mechanism which is housed in hood 14 which in turn drives wheels 16 and 17. To protect the user from flying debris, wheels 16 and 17 are enclosed by fenders 32 and 30, respectively. Fenders 32 and 30 also prevent the user's clothes from catching on the drive mechanism.

Figure 3:
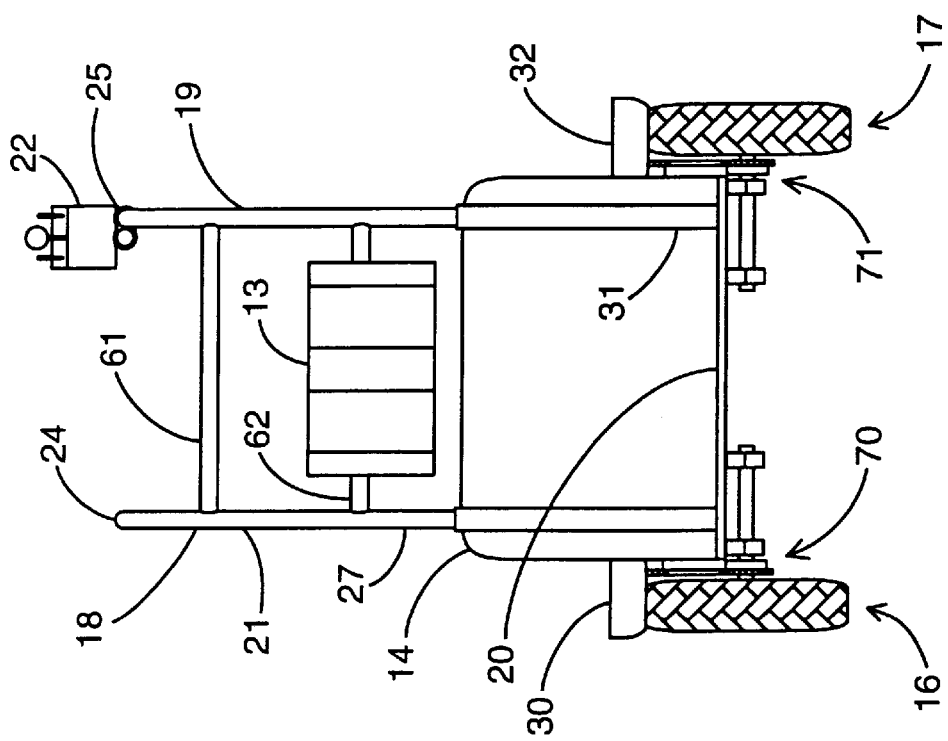
FIG. 3: Is a back view of the invention.
Figure 2:
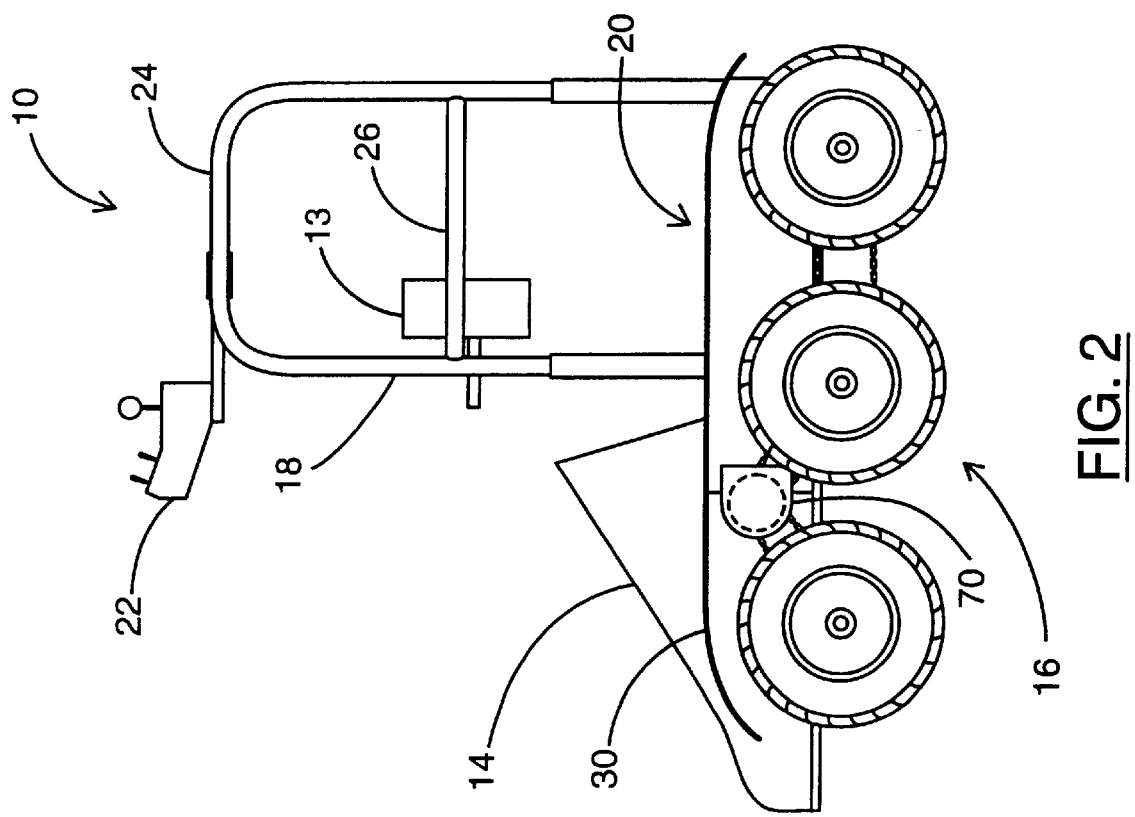
FIG. 2: Is a side view of the invention.

Referring now to FIGS. 2 and 3, drive wheels 16 and 17 are driven by transmissions 70 and 71, respectively, which are in turn driven by the drive mechanism 73 (see FIG. 4) located within hood 14. The engine and batteries and other components of the drive mechanism 73 (see FIG. 4) which is housed in hood 14 are all located forward of top surface 11. Wheels 16 and 17 are mounted to platform 20 such that platform 20 is as low to the ground as possible, thereby ensuring that the center of gravity for the vehicle is as low as possible. The very low center of gravity gives the vehicle greater stability, especially on uneven terrain.

Figure 4:
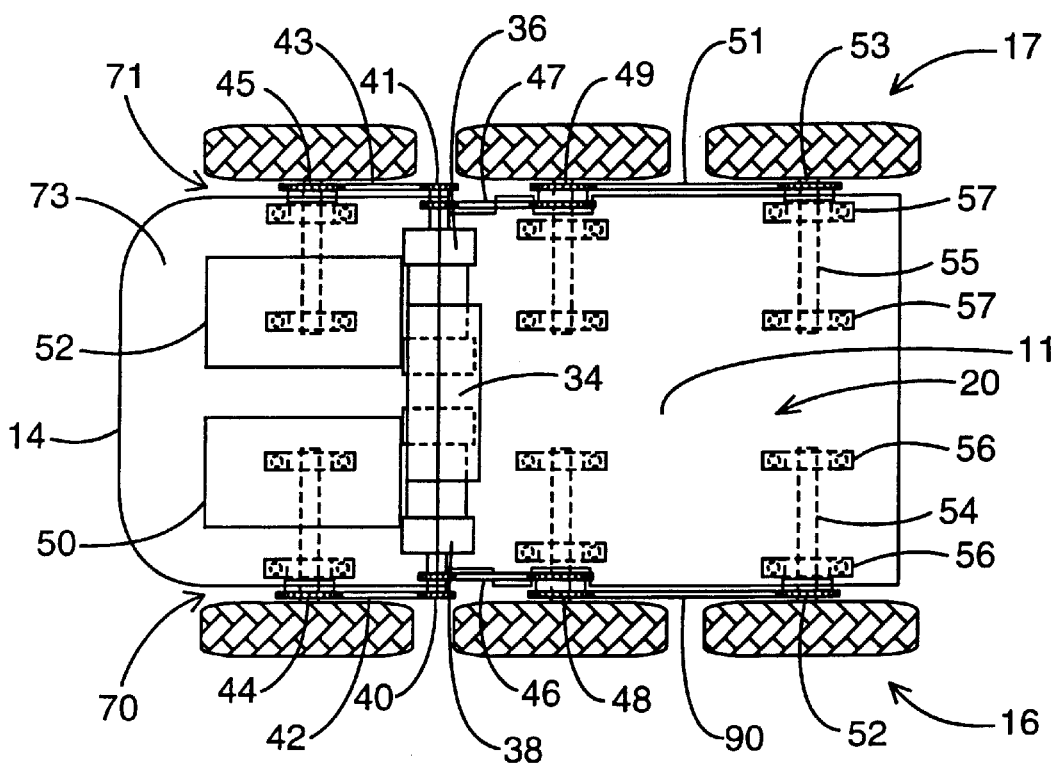
FIG. 4: Is a top view of the invention partly in cross section.

Referring now to FIG. 4, drive mechanism 73 consists of any suitable gasoline or electric powered motor drive mechanism which is operatively coupled to transmissions 70 and 71. Preferably, drive mechanism 73 consists of an electric drive mechanism having rechargeable batteries 50 and 52 which power electric motors 38 and 36, respectively, via electrical controller 34. Electric motor 38 has axle 40 which drives chains 42, 46 and 90 which are in turn operatively coupled to wheels 16 via sprockets 44, 48 and 52, respectively. Each wheel 16 is mounted onto an axle 54 which is in turn mounted to platform 20 by block bearings 56. Likewise, electric motor 36 is provided with axle 41 which is mechanically coupled to drive chains 43, 47 and 51, respectively, which in turn drive wheels 17 via sprockets 45, 49 and 53, respectively. Each wheel 17 is mounted to axle 55 which is in turn mounted to platform 20 by block bearings 57. Electric controller 34 can selectively operate electric motors 36 and 38 such that wheels 16 and 17 can be driven independent of each other. Electric control unit 34 is operatively coupled to controller 22 (see FIG. 1) thereby permitting the user to selectively drive wheels 16 and 17 as required to operate the vehicle. By providing a drive mechanism with multiple drive chains, the vehicle may be operated even if one of the drive chains fail.

Figure 5:
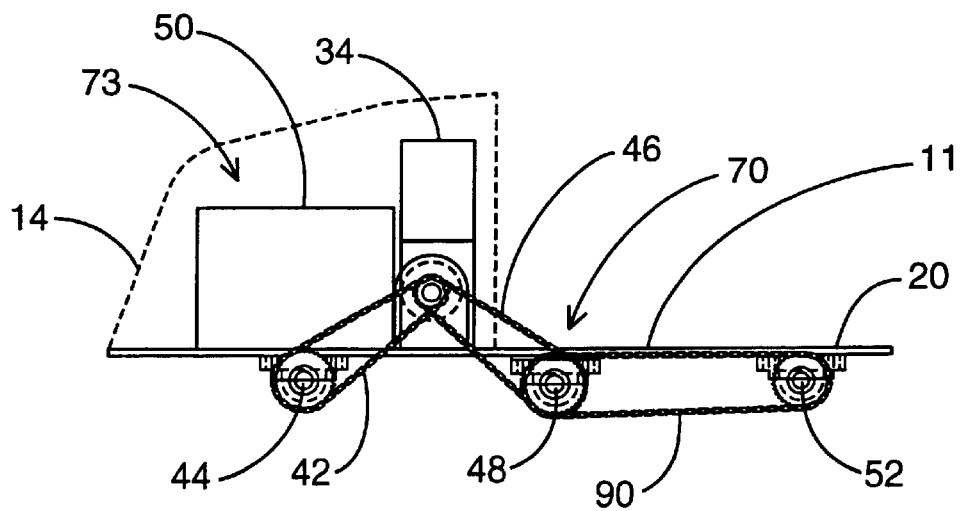
FIG. 5 Is a schematic view of the drive train of the present invention.

Referring now to FIG. 5, the major components of drive mechanism 73, namely the electric batteries, electric motors and electric control unit are mounted to platform 20 at a position immediately in front of surface 11. Therefore, the center of gravity of the vehicle is located forward of surface 11. Hence, when a user stands on platform 11, the user's weight shifts the center of gravity of the vehicle back towards the rear of the vehicle away from hood 14. It has been discovered that locating the center of gravity of the vehicle forward of platform 11 makes the vehicle very easy to right should the vehicle tumble on its side. Furthermore, since surface 11 is very wide relative to its height above the ground, the vehicle has increased stability.

Referring back to FIG. 1, to operate the vehicle, the user enters the vehicle through the back of fairing 18. The user may adjust the lengths of members 19 and 21 such that horizontal members 24 and 25 are positioned slightly above the user's waist. The user can then secure him/herself within fairing 18 by first detaching one of the straps 60 from either members 23 or 26, placing belt 15 behind the user's back and then reattaching the strap. The position of support 13 may then be adjusted by adjusting the length of arm 64 so that the user's knees and shins can comfortably engage support 13. The user can then lean back on belt 15 while pressing his/her legs against 13 in order to be comfortably and securely retained in fairing 18. An individual can easily shift his/her body weight from side to side while standing on top of surface 11 merely by pushing and pulling on horizontal members 24 and 25. Since he/she can hold onto both horizontal members 24 and 25, the operator can actually shift the center of gravity of the vehicle quite considerably. A user who has less control over their legs (such as a disabled person) can effectively shift his/her body weight on surface 11 by first bracing him/herself between belt 15 and support 13 and then pulling and/or pushing on horizontal members 24 and 25. Because the user can shift the vehicle's center of gravity merely by shifting his or her body weight from side to side, the vehicle has improved handling even on rough terrain. In the event the vehicle does fall on its side, the user can easily free him or herself from fairing 18 by detaching belt 15. Since the center of gravity of vehicle is located forward of surface 11, and since horizontal arms 25 and 24 are rigidly attached to platform 20 via members 19 and 21, respectively, a user can easily right the vehicle by taking advantage of the vehicle's center of gravity and the mechanical advantage provided by horizontal arms 25 and 24.

The low profile and the ability of the user to shift the effective center of gravity of the vehicle by shifting his/her body weight permits the vehicle to traverse a wide variety of terrains. Sandy terrain such as dunes and beaches, loose gravel and even hills can easily be traversed by a disabled person using the vehicle.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A self-propelled vehicle comprising:

a housing having a substantially flat surface configured to permit a user to stand on the flat surface, said flat surface having a left and right side and a rear side;

a first handle securely mounted to the housing at a position above the left side of the flat surface at a height above the flat surface sufficient to permit the left hand of the user to grasp the first handle when the user is standing on the flat surface;

a second handle mounted to the housing at a position above the right side of the flat surface at a height above the flat surface sufficient to permit the right hand of the user to grasp the second handle when the user is standing on the flat surface, the first and second handles are positioned on the left and right sides of the flat surface and are open at the rear to permit the user to enter onto the flat surface from the rear side, the first and second handles are sufficiently spaced apart to permit the user to stand on the flat surface between the handles;

a first and second set of wheels mounted to the housing adjacent the left and right sides of the flat surface, respectively; and a drive mechanism for selectively driving the first and second set of wheels, said drive mechanism having a control panel for controlling the drive mechanism, the drive mechanism is positioned so that a majority of components are forward of the flat-surface so that the center of gravity of the self-propelled vehicle is positioned forward of the flat surface.

2. A self-propelled vehicle as claimed in claim 1 wherein the right handle comprises an elongated first member having a first end rigidly mounted to the housing and a second end adapted to be grasped by the user, and the left handle comprises an elongated second member having a first end rigidly mounted to the housing and a second end adapted to be grasped by the user.

3. A self-propelled vehicle as claimed in claim 2 wherein the first and second members comprise telescoping members having adjustable lengths.

4. A self-propelled vehicle as claimed in claim 2 wherein the first member is mounted to the housing adjacent the right side of the flat surface and the second member is mounted to the housing adjacent the left side of the flat surface.

5. A self-propelled vehicle as claimed in claim 1 further comprising a shin support adapted to bear against a front portion of the legs of the user, the shin support being connected to the first and second handles and being positioned above the flat surface and between the first and second handles.

6. A self-propelled vehicle as claimed in claim 5 further comprising a belt having two ends and a middle portion, the middle portion adapted to bear against a portion of the user's back, the two ends being removably connectable to the first and second handles.

7. A self-propelled vehicle as claimed in claim 4 further comprising a cross brace having a first and second end, the first end of the cross brace being rigidly mounted to the first member and the second end of the cross brace being rigidly mounted to the second member.

8. A self-propelled vehicle as claimed in claim 7 further comprising a shin support adapted to bear against a front portion of the user's legs, the shin support being connectable to the cross brace and being positioned above the flat surface and between the first and second handles.

9. A self-propelled vehicle as claimed in claim 8 further comprising a belt having two ends and a middle portion, the middle portion adapted to bear against a portion of the user's back, the two ends being removably connectable to the first and second handles.

* * * * *